United States Patent [19]
Johnson

[11] Patent Number: 5,131,683
[45] Date of Patent: Jul. 21, 1992

[54] TORSO RESTRAINING ASSEMBLY FOR AUTOMOBILE SEAT

[76] Inventor: Ellis D. Johnson, 4511 French Rd., Detroit, Mich. 48214

[21] Appl. No.: 610,623

[22] Filed: Nov. 8, 1990

[51] Int. Cl.$^5$ ............................................. B60R 22/00
[52] U.S. Cl. ................................. 280/808; 297/484
[58] Field of Search ............... 280/801, 808; 297/468, 297/483, 484, 486

[56] References Cited

U.S. PATENT DOCUMENTS

| | | | |
|---|---|---|---|
| 3,325,213 | 6/1967 | Levy | 297/484 |
| 3,454,304 | 7/1969 | Hudak | 297/484 |
| 3,565,483 | 2/1971 | Posey | 297/484 |
| 3,734,562 | 5/1973 | Fourrey | 297/484 |
| 4,854,608 | 8/1989 | Barral | 280/808 |

FOREIGN PATENT DOCUMENTS 2615819 10/1977 Fed. Rep. of Germany ...... 297/484
94053 4/1989 Japan ................................. 280/808

Primary Examiner—Kenneth R. Rice

[57] ABSTRACT

A torso restraining assembly restrains the torso of a passenger in a vehicle seat. The torso restraining assembly is for use with a lap strap. The torso restraining assembly has a strap restraining device for attaching the torso assembly to the vehicle rearwardly of the vehicle seat. A Y-section of the assembly has a pair of straps extending from the strap restraining device, over the seat back. The straps converge. A loop stem extends from the convergence of the straps. The loop stem retains one section of the lap strap. When a passenger is seated in the vehicle seat, the passenger pulls the Y-section over his or her head and down in front of the passenger. When said passenger joins together the buckle and catch of the lap strap, the torso restraining assembly restrains the torso of the passenger against the back of the vehicle seat.

6 Claims, 2 Drawing Sheets

TORSO RESTRAINING ASSEMBLY FOR AUTOMOBILE SEAT

BACKGROUND OF THE INVENTION

1. Field of the Invention

This invention relates generally to an automobile seat belt and more particularly to a safety belt that constrains both shoulders of a seated passenger in an automobile.

2. Description of the Prior Art

Over the many years that passengers have been transported in automobiles, it is relatively recent that passengers have been protected while riding in the automobiles by safety belts or some other means of restraint. The restraint means has evolved from a single lap belt to a generally accepted single, cross-body belt to a combination of a single lap belt and a generally accepted single, cross-body belt. The cross-body belt generally is disposed diagonally across the body of the passenger and joins the lap belt. The belt may be attached to the frame of the automobile, proximate the roof structure.

The cross-body belt as proved an important additional restraint against the passenger being catapulted against structure situated in front of the passenger, for example, the dashboard. A collision that would suddenly stop an automobile would not effect the momentum of a passenger unless the passenger were restrained to decelerate with the automobile. A lap belt would only restrain the passenger's middle with respect to the automobile seat, but will not restrain the upper body of the passenger which continues its momentum to be driven forward, perhaps into a steering wheel and, then, suddenly whipped backward. Collisions with parts of the automobile and the whipping cause sudden and violent trauma to the passenger's body.

Just as the lap belt has limited effect in restraining only parts of the body while allowing other parts to move relatively thereto, so too does the diagonal shoulder belt have limited effect. In the latter instance, one should may be restrained against the seat while the other continues to move forward. While this may pose little danger of injury from the passenger colliding with structure situated in front of the passenger, the relative movement of one shoulder with respect to another might cause other injuries to the body, such as fracture of the collar bone, whip-lash of the neck and back, or internal muscle and other structural, muscle, and tissue tears.

Government regulations promulgated by the Department of Transportation specify requirements for seat belt assemblies for use in passenger vehicles. Among these regulations are the requirements that seat belts be designed for use by only one person at any one time, that seat belts have a pelvic restraint designed to remain on the pelvis of the passenger under conditions of collision or roll-over of the vehicle and that an upper torso restraint be provided without shifting the pelvic restraint into the abdominal region.

OBJECTS OF THE INVENTION

It is therefore an object of the present invention to provide a full feature belt that would restrain most of the body in the posture that the body experiences while seated without an inertial disparity between the automobile and the passenger and between vulnerable parts of the passenger's body.

It is also an object of the present invention to provide a full feature belt that will conform to government regulations.

SUMMARY OF THE INVENTION

According to the present invention, a torso restraining assembly restrains the torso of a passenger in a vehicle seat during a collision of the vehicle or other sudden stopping of it. Preferably, the invention is to be used in a passenger vehicle with a vehicle safety belt that has a lap strap divided between two sections of webbing. One lap strap webbing section has a buckle and the other lap strap webbing section has a catch. The buckle and catch are capable of joining together to join the sections of the lap strap. The vehicle seat has a seat back and a seat cushion that extends forwardly of the seat back.

The invention includes a strap restraining assembly for attaching the torso assembly to the vehicle rearwardly of the vehicle seat. The strap restraining means includes a pair of strap retractors. As is known in the art, the strap retractor has a mechanism that allows the strap to be pulled to a desired length, but will lock the strap at a situated length when it is suddenly pulled to over come a predetermined inertial force. Bolts secure the torso restraining assembly to the vehicle.

A Y-section has a pair of straps that extend from the strap restraining means, over the seat back to converge together. A pair of guides are spaced substantially apart on top of the seat back. Each of the guides has one of the straps of the Y-section extending though it. Because of the convergence of the straps, the Y-section is retained on top of the seat, notwithstanding the pull of the retractors.

A loop stem extends from the convergence of the straps. The loop step retains one section of the lap strap, which extends through the loop stem.

When a passenger is seated in the vehicle seat and the passenger pulls the Y-section over his or her head and then down in front of him or her, the passenger may join together the buckle and catch. This situates the torso restraining assembly so that is restrains the torso of the passenger against the back of the vehicle seat when the passenger is so disposed at the time of a sudden stop of the vehicle, for example, when the vehicle is involved in a collision.

DETAILED DESCRIPTION OF THE PREFERRED EMBODIMENT

Figure 1:
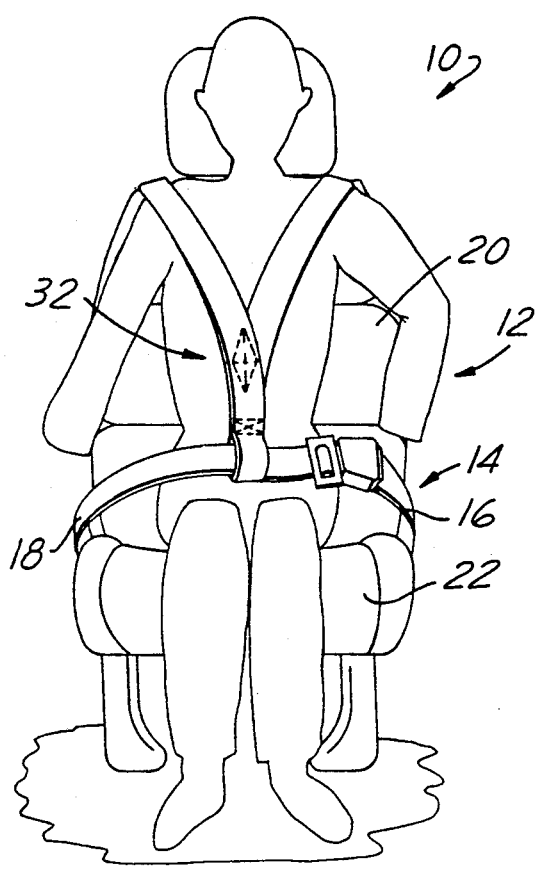
FIG. 1 is a front view of a vehicle seat with a passenger therein using the torso restraining assembly that is the preferred embodiment of the invention.
Figure 3:
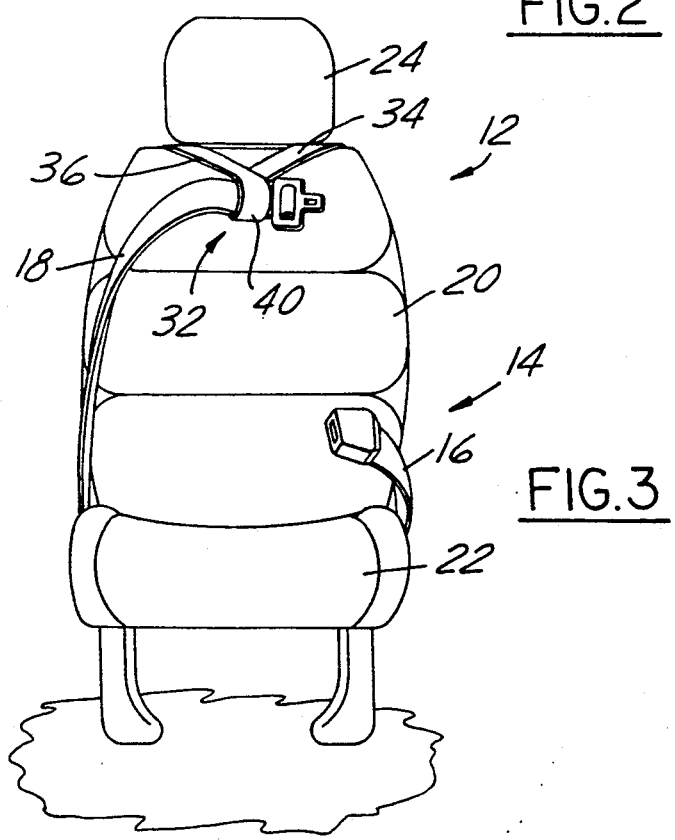
FIG. 3 is a front view of a vehicle seat without a passenger therein using, showing the torso restraining assembly that is the preferred embodiment of the invention.

A torso restraining assembly will be described in reference to the Figures, with the torso restraining assembly being generally referred to be the reference numeral 10. With particular reference to FIGS. 1 and 3, the torso restraining assembly 10 is shown in use with a vehicle seat 12 by a passenger 50. A standard vehicle seat 12 is of the kind used in a passenger vehicle. Preferably, but not as a limitation of the invention, the vehicle seat 12 is a single, "bucket" seat, more prominently used as a front passenger seat of the vehicle.

According to government regulations, such a seat is required to have at least a lap safety belt or strap 14. It is a standard arrangement for the lap strap 14 to have two sections of webbing. One lap strap section 16 has a buckle and the other lap strap section 18 has a catch. The buckle and catch are capable of joining together to join the sections of the lap strap 14. The vehicle seat 12 has a seat back 20 and a seat cushion 22 that extends forwardly of the seat back 20. A head restraint 24 is required for such a seat in a passenger vehicle.

Figure 2:
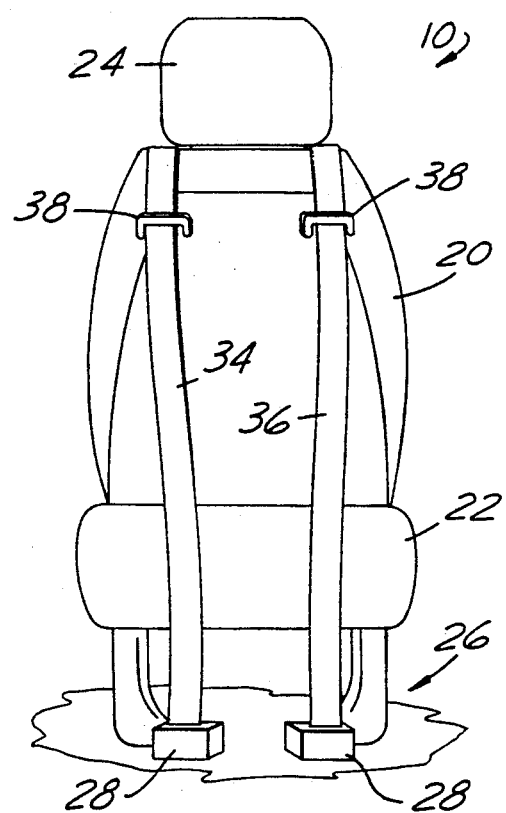
FIG. 2 is a rear view of a vehicle seat with the torso restraining assembly that is the preferred embodiment of the invention.

With reference to FIG. 2, the invention includes a strap restraining mean, where, a strap restraining assembly 26 for attaching the torso restraining assembly 10 to the vehicle rearwardly of the vehicle seat 12. The strap restraining means 26 includes a pair of strap retractors 28. Bolts 30 secure the torso restraining assembly 10 to the vehicle.

Referring once again to FIGS. 1 and 3, Y-section 32 has a pair of straps 34 and 36 that extend from the strap restraining means 26, over the seat back 20 to converge together. A pair of guides 38 are spaced substantially apart at the upper portion of the seat back 20. Each of the guides 38 has one of the straps 34 or 36 of the Y-section 32 extending though it. Because of the convergence of the straps 34 and 36, the Y-section 32 is retained on top of the seat back 20, notwithstanding the pull of the retractors 28.

The Y-section 32 also includes a loop step 40, which extends from the convergence of the straps 34 and 36. The loop step 40 retains one section 18 of the lap strap. The one section 18 of the lap strap extends through the loop stem 40.

Figure 4:
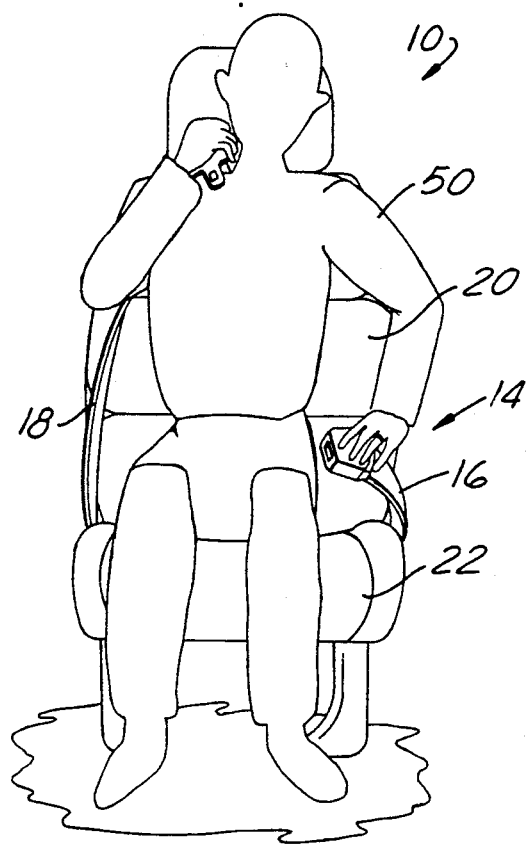
FIGS. 4–6 illustrate how a passenger secures himself or herself in the torso restraining assembly that is the preferred embodiment of the invention.
Figure 5:
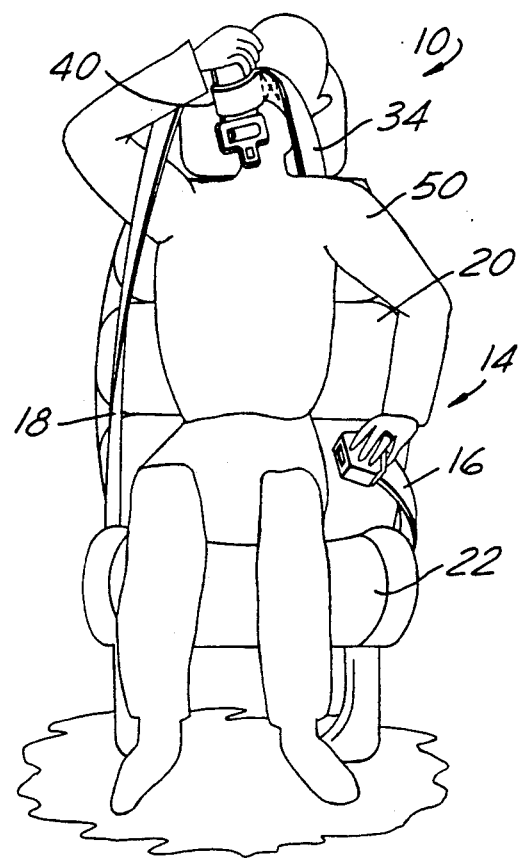
Figure 6:
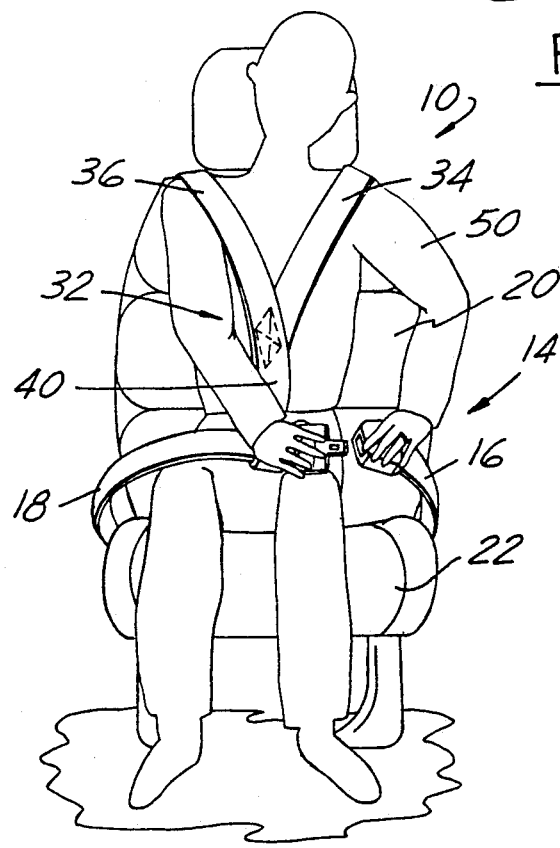

FIGS. 4–6 illustrate how a passenger might secure himself in the torso restraining assembly 10. The passenger 50 is seated in the vehicle seat 12, as shown in FIG. 4. He reaches back for the Y-section 32. As seen in FIG. 5, the passenger 50 pulls the Y-section 32 over his head and then down in front of him. As seen in FIG. 6, the passenger 50 joins together the buckle and catch of the lap strap 14. This situates the torso restraining assembly 10, as shown in FIG. 1, so that it restrains the torso of the passenger 50 against the back 20 of the vehicle seat 12 when there is a sudden forward acceleration of the passenger 20 relative to the seat 12.

I claim:

1. A torso restraining assembly to restrain the torso of a passenger in a vehicle seat for use in a passenger vehicle with a vehicle safety belt having a lap strap divided between tow sections, one lap strap section having a buckle and the other lap strap section having a catch, said buckle and catch capable of joining together to join said sections of said lap strap, said vehicle seat having a seat back and a seat cushion extending forwardly of said seat back, the torso restraining assembly comprising:

strap restraining means for attaching the torso assembly to the vehicle rearwardly of the vehicle seat;

a Y-section having a pair of straps extending from said strap restraining means and over sad seat back, having a convergence of said straps, and having a loop stem extending from said convergence of said straps, said loop stem for retaining one section of said lap strap;

whereby when a passenger is seated in said vehicle sat and said passenger pulls said convergence over the head of said passenger and down in front of said passenger and when said passenger joins together said buckle and catch, said torso restraining means restrains the torso of said passenger against the back of said vehicle seat.

2. The torso restraining assembly of claim 1, wherein the trap restraining means includes a strap retractor for winding at least one of said straps of said Y-section therein and wherein a pair of guides are spaced substantially apart on top of said seat back, each of said guides having one of said straps of said Y-section extending therethrough.

3. The torso restraining assembly of claim 2, wherein there are a pair of said strap retractors, one for each of said straps of said Y-section.

4. The torso restraining assembly of claim 3, wherein said strap restraining means includes bolts to secure the torso restraining assembly to said vehicle.

5. The torso restraining assembly of claim 3, wherein at least one of said sections of said lap strap is attached to a strap retractor.

6. The torso restraining assembly of claim 1, wherein one section of said lap strap extends through said loop stem.

* * * * *